United States Patent [19]
Richard et al.

[11] Patent Number: 6,149,438
[45] Date of Patent: *Nov. 21, 2000

[54] SYSTEM AND METHOD FOR THE DELIVERY, AUTHORING, AND MANAGEMENT OF COURSEWARE OVER A COMPUTER NETWORK

[75] Inventors: Jerry P. Richard, Lucas; Richard O'Bryant, Richardson; Verlon P. Harmon, Dallas, all of Tex.

[73] Assignee: Texas Instruments Incorporated, Dallas, Tex.

[ * ] Notice: This patent is subject to a terminal disclaimer.

[21] Appl. No.: 08/473,616

[22] Filed: Jun. 7, 1995

Related U.S. Application Data

[63] Continuation of application No. 07/742,974, Aug. 9, 1991.

[51] Int. Cl.$^7$ ........................................................ G09B 5/14
[52] U.S. Cl. ............................ 434/322; 434/323; 434/335; 434/336; 434/362
[58] Field of Search .............................. 434/118, 322, 434/323, 335, 336, 350, 362

[56] References Cited

U.S. PATENT DOCUMENTS

| | | | |
|---|---|---|---|
| 4,636,174 | 1/1987 | Andersen et al. | 434/335 |
| 4,764,120 | 8/1988 | Griffin et al. | 434/336 |
| 4,793,813 | 12/1988 | Bitzer et al. | 434/335 |
| 4,820,167 | 4/1989 | Nobles et al. | 434/335 |
| 4,964,077 | 10/1990 | Eisen et al. | 434/118 |
| 5,002,491 | 3/1991 | Abrahamson et al. | 434/323 |
| 5,103,498 | 4/1992 | Lanier et al. | 395/927 |
| 5,144,556 | 9/1992 | Wang et al. | 364/419 |
| 5,239,617 | 8/1993 | Gardner et al. | 434/118 |

FOREIGN PATENT DOCUMENTS

| | | | |
|---|---|---|---|
| 0279558 | 8/1988 | European Pat. Off. | 434/322 |

*Primary Examiner*—Jessica J. Harrison
*Attorney, Agent, or Firm*—W. Daniel Swayze, Jr.; W. James Brady, III; Frederick J. Telecky, Jr.

[57] ABSTRACT

A network system for computer aided instruction, comprises a main computer with a repository for storing courseware, a network of servers connected to the main computer, a number of local area networks, each connected to a server, and each comprising a number of interconnected workstations, a distributed delivery system responsive to a student's request for a course, operable to search the network for a server where the requested course resides, and operable to retrieve the course from the repository, and an authoring system distributed over the workstation, the servers and the main computer, and operable to transfer courses from a workstation to the repository, and a course management system distributed over the workstation, the servers and the main computer, and operable to manage course enrollment and to monitor student performance at said servers, and further operable to transfer information concerning course enrollment from said servers to said main computer.

A computer program having provisions for training users in its use, comprises application code, hook points connected to the application code, and embedded training routines connected to the hook points, so that there is a mapping between the hook points and the embedded training routines. The application code has code responsive to a user action to transfer control from the hook points to the embedded training routines.

11 Claims, 14 Drawing Sheets

| COURSE | COURSE VERSION | STATUS | DATE | EXECUTABLE LOCATION | CONTROL LOCATION |
|---|---|---|---|---|---|
| MSG | 1 | OBSOLETE | JULY 1,1990 | DSK1:MSG_1.EXE | DSK1:MSG_1.CTL |
| MSG | 2 | OBSOLETE | AUG. 1,1990 | DSK1:MSG_1.EXE | DSK2:MSG_2.CTL |
| VMS | 1 | OBSOLETE | APRIL 1,1990 | DSK1:VMS_1.EXE | DSK2:VMS_1.CTL |
| VMS | 2 | CURRENT | MARCH 1,1990 | DSK2:VMS_2.EXE | DSK2:VMS_2.CTL |
| MSG | 3 | CURRENT | JUNE 1,1990 | DSK1:MSG_3.EXE | DSK1:MSG_1.CTL |

201

| STUDENT | COURSE | COURSE VERSION | STATUS |
|---|---|---|---|
| JAMES DINN | MSG | 2 | AUTHORIZED FOR ENROLLMENT |
| JEFF LEVINE | VMS | 2 | COMPLETED |
| MIKE REYNA | MSG | 3 | PROGRESSING SATISFACTORILY |
| JACK CROUCH | VMS | 1 | FALLING BEHIND |

203

| STUDENT | COURSE | COURSE VERSION | GRADE |
|---|---|---|---|
| JAMES DINN | VMS | 1 | A |
| MIKE REYNA | VMS | 1 | B |

205

| COURSE | VERSION | SERVER |
|---|---|---|
| MSG | 1 | VAX7 |
| MSG | 1 | VAX3 |
| VMS | 2 | VAX7 |
| VMS | 1 | VAX5 |
| VMS | 2 | VAX3 |
| MSG | 3 | VAX7 |
| MSG | 3 | VAX5 |

209

| COURSE | MASTER INSTRUCTOR | LOCATION |
|---|---|---|
| MSG | PAULA ZAMMAMA | VAX1 |
| VMS | JACK DECKER | VAX3 |

207

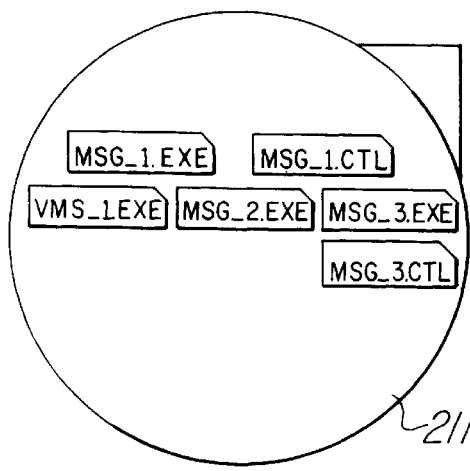
DSK1

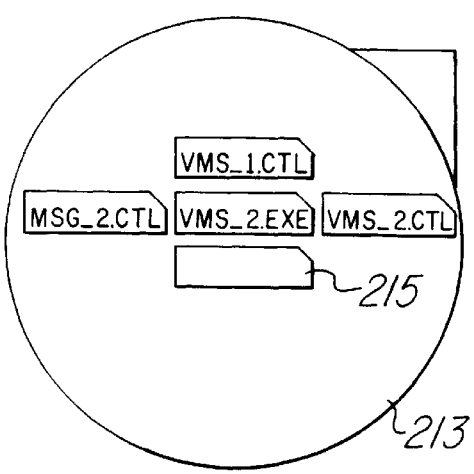
DSK2

FIG. 2

| RULE 801 | GOTO 803 | ADDRESS 805 |
|---|---|---|
| ON SCREEN 10 AND INCORRECT ANSWER TO QUERY 2 REPEATED 5 TIMES | SCREEN 27 | AF00 1E08 |
| DOING DIRECTORY COMMAND AND REPEATEDLY ENTERS INCORRECT FILE SPECIFICATION | SCREEN 4 OF FILE SPECIFICATION | AF00 11EFF |
| DOING VMS BEGINNERS COURSE AND HAS ANSWERED THE LAST 20 QUESTIONS CORRECTLY | GOTO SCREEN 1 OF INTERMEDIATE COURSE | AF01 00E5 |

SYSTEM AND METHOD FOR THE DELIVERY, AUTHORING, AND MANAGEMENT OF COURSEWARE OVER A COMPUTER NETWORK

This is a Continuation of application Ser. No. 07/742,974, filed Aug. 9, 1991, pending.

NOTICE (C) Copyright Texas Instruments Incorporated 1991. A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

This invention relates to computer aided instruction and in particular to a system and method for delivery, authoring, and management of courseware over a computer network.

2. Description of the Related Art

Hitherto Computer Aided Instruction (CAI) has followed two approaches, which may be labelled "the mainframe approach" and "the diskette delivery approach", respectively. Inherent to both are certain problems which make them unattractive for authoring and maintenance of educational materials, e.g., course authoring, course maintenance and course management.

In "the mainframe approach" of CAI the computerized course is a computer program stored and executed on a mainframe computer. This approach requires that each student of a particular course has access to the computer on which the program corresponding to the course resides. However, in many organizations it is not possible for all potential students to have access to a particular mainframe. Another limitation of the "mainframe approach" is that downtime affects all users. Furthermore, if the mainframe computer used for many concurrent tasks, e.g., many students taking many courses simultaneously or the CAI running in parallel with other tasks, then the responsiveness is often impaired. This aspect of "the mainframe approach" negatively effects the quality of the interaction between the courseware and the students.

In the "diskette delivery" approach, courses are delivered on a diskette and are executed by the student on his or her personal workstation. A problem with this approach is that the education administrator loses control over the course. For example, the original recipient of the course diskette may make a copy of the course and give this copy to a colleague without notifying the course administrator. Moreover, the course administrator is unable to monitor student progress and verifying that a student who enrolls in a course actually takes and eventually completes the course.

Losing control over the diskette also results in the course administrator losing control over which version of a course a student is taking. For example, if the student who originally obtains a given course, after finishing it, passes it on to a colleague and in the meantime a new update or a corrected course is released, the colleague would be taking an obsolete version. In case there are problems, e.g., bugs, in the software which constitutes a course, not being able to control which versions are actually used is a serious problem.

Another aspect of computerized training is help facilities, which provide a documentation support to computer programs. These facilities feature a "current screen" oriented user interface. The problems with this approach to training is that a user must both know that he or she has a problem and must know where to look for documentation on the problem.

Furthermore, such systems are limited to being help facilities as opposed to providing user training. Prior art training systems are stand alone programs, which are separate from the application programs to which they provide training. These systems require the user to leave the application program in order to enter the training sequence.

Another problem with prior art training systems is that there is no correlation between the mistakes a user makes in operating a system and the training provided to the user. It is required of the user to know when he or she is making a mistake, and upon realizing a mistake is being made, the user must know where to look for training materials.

Accordingly, improvements which overcome any or all of these problems with existing Computer Aided Training systems are presently desirable.

SUMMARY OF THE INVENTION

A network system for computer aided instruction, comprises a main computer with a repository for storing courseware, a network of servers connected to the main computer, L number of local area networks, each connected to a server, and each comprising a number of interconnected workstations. In this network a distributed delivery system is responsive to a student's request for a course and is operable to search the network for a server where the requested course resides. If the course is not resident on any server the delivery system operates to retrieve the course from the repository.

The network computer aided training system also incorporates a course management system, which also is distributed over the network. It is operable to manage course enrollment and to monitor student performance at the servers and to transfer information concerning course enrollment from the servers to the repository at the main computer.

The network system also has an authoring system which is distributed over the workstation, the servers and the main computer, and is operable to transfer courses from a workstation where the course author works to the repository. The authoring system also provides the course author with tools for automatically generating templates for courses from interviews with subject matter experts and tools for creating various types of interaction screens.

Courses are developed to provide multiple levels of detail ranging from an overview of the subject matter to a high level of detail and comprehensive testing. There are also intermediate levels, for example, one in which detailed information is provided but testing only occurs at the end of each lesson and a relatively low score is considered as "passing."

In one aspect of the invention, computer programs have provisions for training users in its use, comprises application code, hook points connected to the application code, and embedded training routines connected to the hook points, so that there is a mapping between the hook points and the embedded training routines. The application code has code responsive to a user action to transfer control from the hook points to the embedded training routines. Furthermore, the embedded training routines are operable to transfer control to courses which provide a higher level of detail.

It is an object of the invention to manage courseware in a non-exclusive fashion both at a central repository and at servers located throughout a computer network.

It is another object of the invention to enable a student working at a workstation located anywhere in the computer network to request enrollment in courses which may or may not be located at a server connected to the student's workstation.

It is an additional object of the invention to manage the enrollment and to monitor the performance of a student at the server to which the student's workstation is attached, and to transfer the enrollment and performance information from the server to a main repository.

It is a further object of the invention to embed training materials into application programs while allowing the training materials to be located at any server or repository in the network.

It is also an object of the invention to enable course authors to transfer new courses and updates to old courses from their individual workstations into a main repository for courseware from which students may retrieve the courses.

It is an additional object of the invention to allow course managers to be privy to information concerning the courses they manage, e.g., questions which appear to be defective, so that they can use that information in updating the courses which they manage.

BRIEF DESCRIPTION OF THE DRAWINGS

FIG. 2 is a database schema and file structure for the preferred embodiment of the networked computer aided instruction system.

DETAILED DESCRIPTION OF PREFERRED EMBODIMENTS

Figure 1:
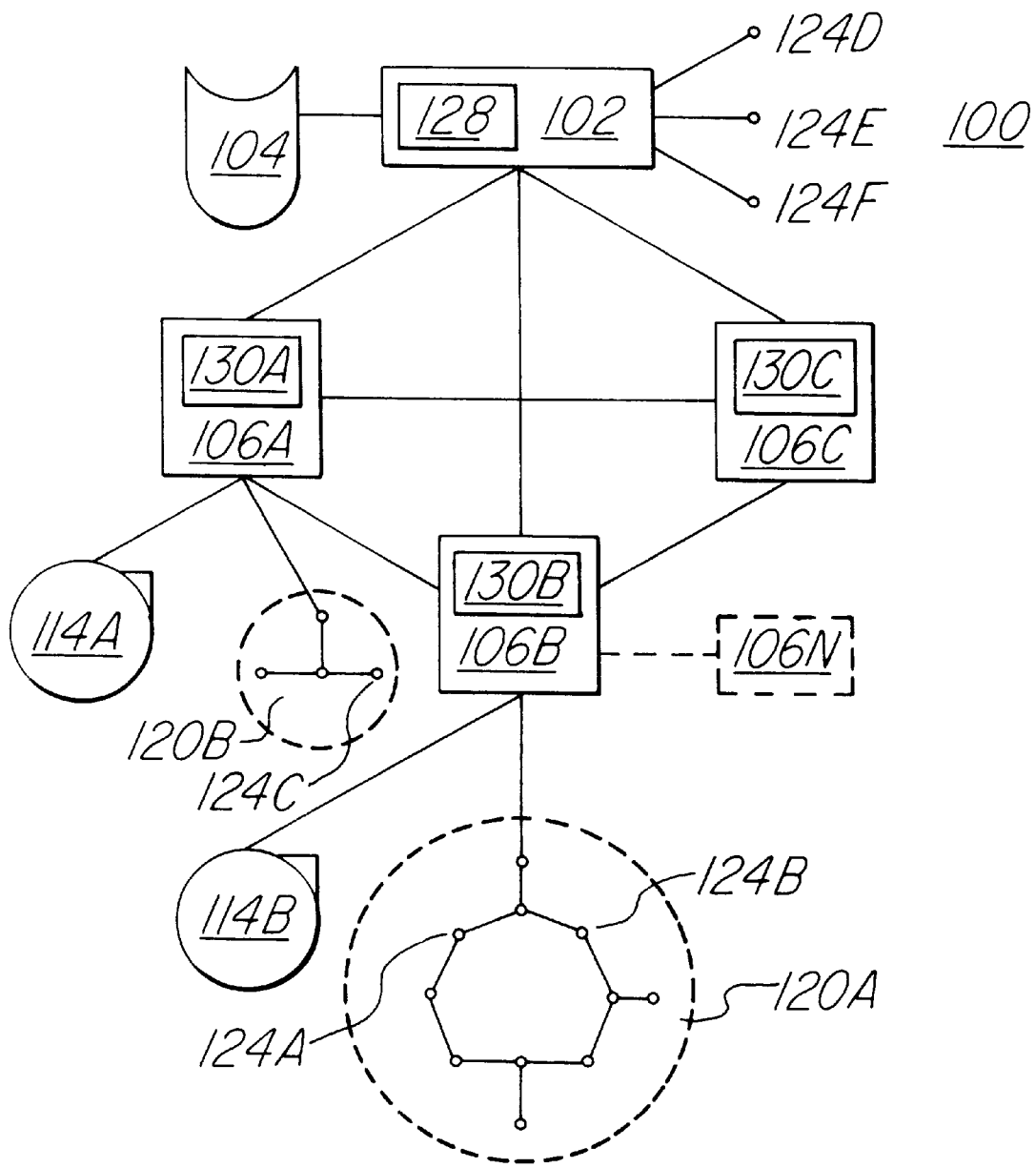
FIG. 1 is a block diagram of a computer network environment in which the invention operates.

FIG. 1 is a block diagram of a computer network environment in which the invention operates. In FIG. 1, a main computer 102 is part of a computer network 100. Repository 104 is connected to main computer 102. Computer network 100 also consists of a large number of servers, for example servers 106A, 106B, and 106C. Each server may have associated with it some file storage, e.g., disks 114A and 114B. The servers are connected to and "serve" local area networks (LAN) 120. These LANs consist of interconnected workstations, e.g, workstations 124A, 124B, and 124C. Workstations, e.g., 124D, 124E, and 124F, may also be connected directly to main computer 102. In FIG. 1, each small circle designates a workstation. In an alternative embodiment, some servers are peer servers, i.e., they are workstations in the same LAN as the workstations they serve.

Typical to large organizations, such as corporations, universities and government agencies, is that computer networks, such as the one depicted in FIG. 1, consists of hundreds or thousands of computers. These computers may be connected in a myriad of different ways. FIG. 1 shows only one way in which the relatively small number of computers shown there can be connected. A person of ordinary skills in the art will realize that the present invention is in no way dependent on the number of computers in the network or how these computers are connected to one another.

Another typical feature of computer networks is that the types of computers in the network varies widely. Therefore, it is of primordial importance that the computers, which are of differing manufacture, may communicate with each other, and any software products which rely on distributing tasks over the various computers in the network should be so constructed as to make the differences between the various kinds of computers in the network moot. The present invention is cognizant of these problems inherent to computer networks with multiple types of computers.

From the network point of view, main computer 102 may be no different than any other computer in the network. However, from the perspective of the present invention, main computer 102 serves the designated function of managing a central repository 104 of courseware. FIG. 2 is a schematic of repository 104. It shows a relational database implementation of the database in which course and student information is stored. The repository 104 can be implemented using other database technology, such as those based on the entity-relationship model, the hierarchical model, and the network model.

In the network environment of FIG. 1, repository 104 is distributed over the computers that constitute the network. Certain redundant information is kept in the servers, so that in the event that part of the network is down, then the information which goes into the repository can be held in a server. Similarly, courses may be stored on multiple servers so that access to a given version of a course is possible without accessing the central repository 104. Periodically, the distributed database is verified with respect to the information held in the central repository 104, so as to assure that no inconsistent information is held by any of the servers. The verification process comprehends updating, at all sites in the network, the programs which are implementations of courses, and the databases which store enrollment information, charges for courses, and locations for course versions.

A student working on a workstation 124 requests a course. This prompts two actions from the server 106 attached to the LAN which the workstation is attached. The first action is to check whether the student is authorized for taking the course. If the student has been authorized to enroll, the second action, searching for the course, commences. Searching for the course entails first looking in the local copy of the repository to see if the current version of the course is resident on the server. If it is not, the network is searched. In the preferred embodiment of the invention the server sends queries to the other servers 106 in the network 100, asking for the course. If a queried server has the course, it replies to querying server with the location of the course. If the queried server does not have the course, it passes the query on to all other servers, unless it recognizes the query as being one which it has already passed on to other servers, in which case the queried server does nothing.

The search for a course eventually leads to the main computer 102. All courses are stored in the repository 104, therefore, the query can be satisfied. The appropriate reply is sent back to the requesting server.

Because the search may go through several paths in the network, it is possible that more than one server replies with the location of the course. For that reason, the number of links which the course must pass through, and the transaction cost associated with each link is computed as the reply makes its way back to the requesting computer. The requesting computer uses this information to decide from which server it can most expeditiously and inexpensively copy the course. It then requests that the course be copied to its file storage. At the same time, the information that the course is being copied to the requesting server is sent to the main computer 102 so that repository 104 can be updated.

Figure 3:
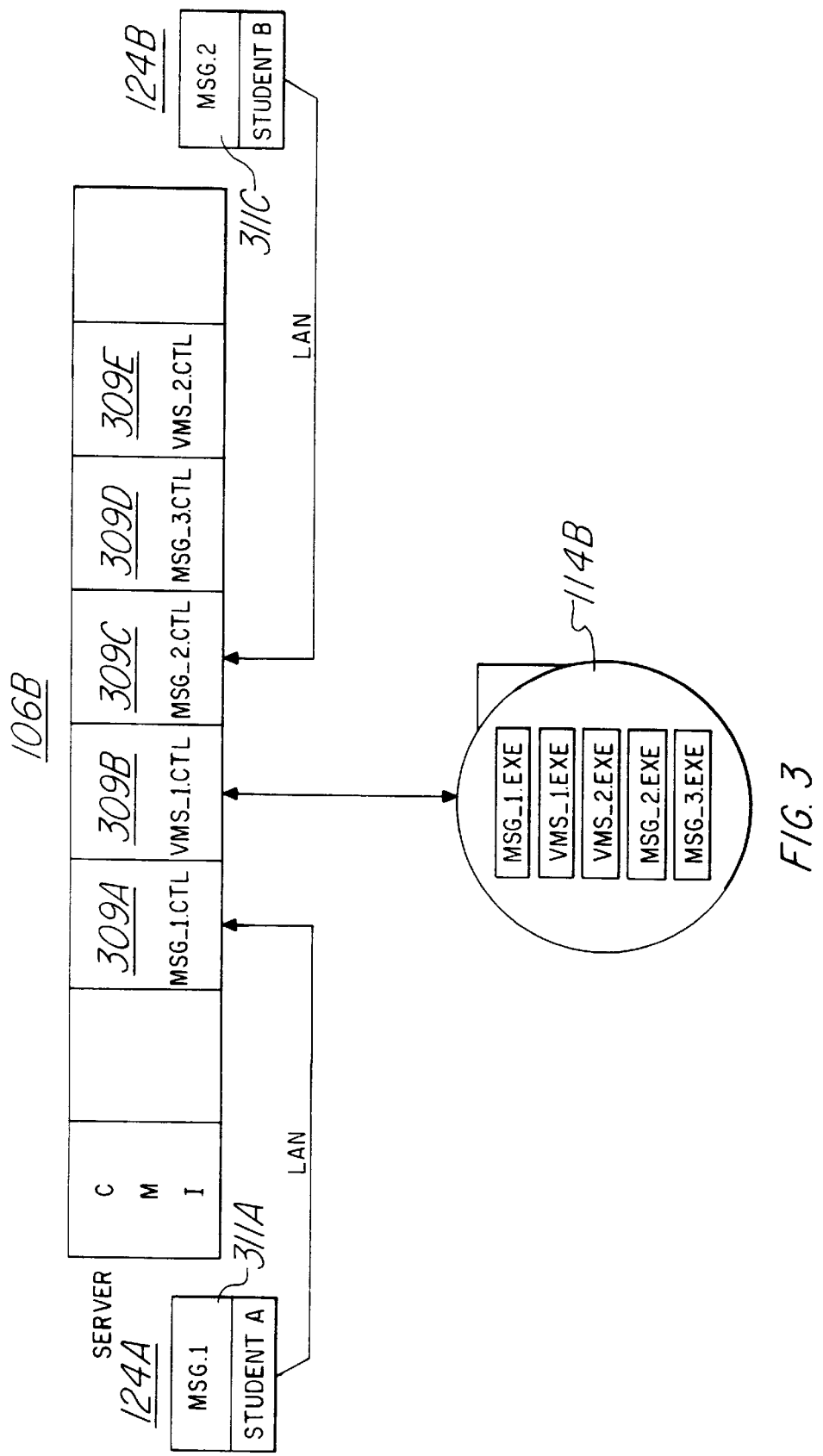
FIG. 3 shows the programs operating on a server and two workstations according to the preferred embodiment computer aided instruction system.

FIG. 3 shows the programs operating on a server 106 and two workstations 124 according to the preferred embodiment computer aided instruction system. When a student requests a course it is not copied beyond the server 106 which serves the LAN to which the student is connected. The student's workstation merely receives an execution module 311 for the course. This execution module 311 interacts with a course control module 309 in the server. FIG. 3. shows this architecture. Student A, on workstation 124A, executes execution module MSG_1.EXE (311A). The corresponding control module MSG_1.CTL (309A) executes on server 106. These two modules communicate via the LAN that connects the workstation 124A to the server 106. Similarly, student B, on workstation 124B, executes execution module MSG_2.EXE (311C), which in turn communicates with control module MSG_2.CTL (309C), on server 106.

Thus, by giving the student access to the execution module 311 of a course does not give up control of the course. The course control module 309 is never down loaded beyond the server level. Thereby making it impossible for a student to make copies of a course and distribute it to colleagues. In the event a copy is made of the execution module 311 of a course and that module is executed on another workstation, it will try to access the corresponding control module 309 on a server, which in turn would be able to do the requisite course management.

Server 106B also has connected to it file storage 114B which contains the execution modules for the various courses resident on server 106B. The purpose of storing the execution modules on the server is two fold: first, so that the execution module can be down loaded to the workstations connected to the server, and, second, so that if another server requests a course, both the execution module and the control module for that course can be copied to the requesting server.

Figure 4:
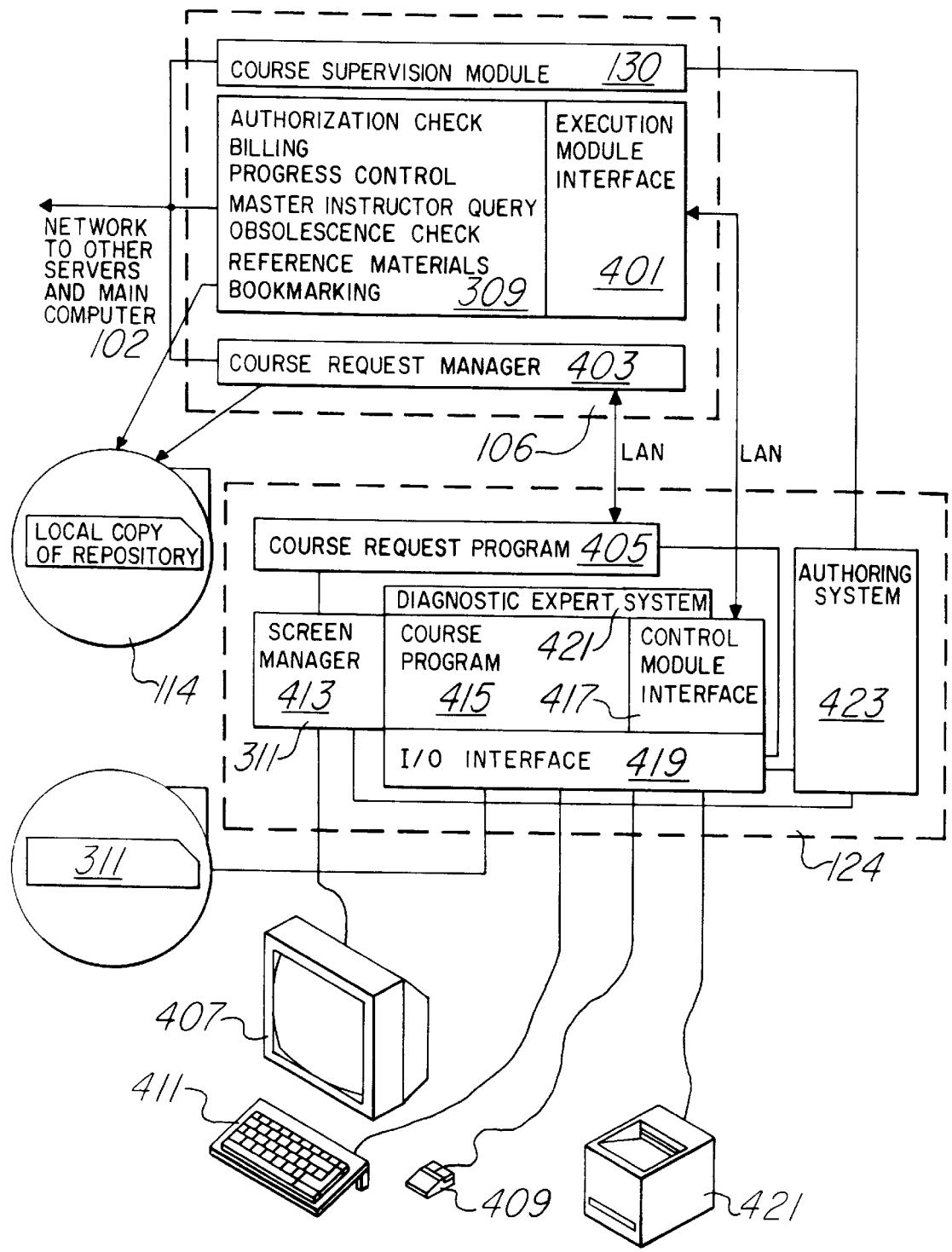
FIG. 4 shows internal details of the programs operating on a server and a workstation according to the preferred embodiment.

FIG. 4 shows more detail of the programs resident on each server 106 and each workstation 124. On the servers 106 a course request manager 403 responds to course requests made on workstation 124 by means of a course request program 405. The workstation 124 is connected to a CRT 407, a keyboard 411, and a mouse 409. A student operating workstation 124 interacts with the programs resident on workstation 124 using devices 407, 409 and 411. In the operating system controlling the workstation (e.g., DOS or UNIX) there are ways for invoking the course request program 405. The course request program 405 may interact with the student using a menu oriented interface or by accepting commands typed on keyboard 411. When the course request program 405 obtains a course request from a student it sends a message to server 106, in particular to the course request manager 403. The course request manager 403 then checks the local repository to determine if the student is authorized for the course and if the course is resident on the server 106. If the authorization is not found on the server, then course request manager 403 sends a message to the main computer 102 via the network 100. Similarly, if the course is not found on server 106, course request manager 403 initiates a search, as described above.

The course execution modules 311, are resident on workstations 124, and consist of screen manager 413, a course program 415, a control module interface 417, and an input/output interface 419. The course program 415 is the kernel of the course execution module 311. It contains, in computer executable form, the educational material taught through the course. The course program 415 interacts with screen 407 via screen manager 413, and with printer 421, keyboard 411 and mouse 409 via input/output interface 419. Course program 415 interacts with course control module 309 through control module interface 417. Control module interface 417 sends messages over the LAN to the execution module interface 401 of course control module 309.

Each course control module 309 contains an execution module interface 401. The role of the interface is to receive and send messages to the execution module 311 corresponding to the control module. Furthermore, each course control module 309 for a course contains an authorization check procedure, a billing procedure, a progress control procedure, a master instructor query procedure, an obsolescence check procedure, a reference materials procedure, and a bookmarking procedure. Each of these procedures may access the network by sending messages to other servers 106 and to the main computer 102. These procedures also access the local version of the repository, thereby making it possible for the course management on the main computer 102 to access the databases on the various servers 106 to update student progress and course enrollment.

An additional advantage of splitting a course into a control module 309 and an execution module 311 is that certain portions of a course may be retained on the servers 106, thereby freeing disk resources on the workstations 124 and facilitating course maintenance. For example, if a course is found to have a defective routine, and that routine is located on the servers 106 rather than on the workstations 124, then it is possible to replace the routine without changing the portions of the course resident on workstations 124. This is advantageous because typically there is no central control over the software resident on individual workstations 124.

Course control module 309 contains a bookmarking facility. This is a procedure which is responsive to a message from a student that he or she wishes to take an extended pause from the course but return to it at the exact current state. In other words, the student's location in the course and the current results Are saved into a bookmark file. This file is stored on the file storage device of the server. In an alternative embodiment the bookmark file is created on the workstation and saved on the workstation's file storage.

Returning to FIG. 2, relation (also known as table) 201 contains the status of each course. As courses are updated older versions of the courses become obsolete. The status column is used to store information about which courses are current and which are obsolete. The date column serves a dual purpose, namely, for current courses it indicates when that version became the current version, and for obsolete versions, the date column indicates when the course will no longer be available. As can be inferred from FIG. 3, an obsolete course may remain available after it has become obsolete, so as to allow students to complete the same version of a course as the version in which they started the course. However, after a predetermined obsolescence period the course is made unavailable, regardless of whether certain students have yet to complete it.

Relation 201 is also a store for information on where to find local versions of the courses. The "executable location" column gives a disk address where the executable module for a course is located and the "control location" column gives the corresponding location for the control module. The actual programs which make up a course are located on disk drives 211 and 213.

Relation 203 is a store of the students' status information with respect to relevant courses. Examples of status are "authorized for enrollment", "completed", "dropped out", "falling behind", "progressing satisfactorily", and "pausing". Relation 205 is a store for students' grades. Relation 207 contains a list of "master instructors" for all courses. A master instructor is a person with particular skills relevant to particular courses. If a student on a workstation 122 has a problem with understanding a course the student can invoke a special query procedure which retrieves the master instructor's name and network address, and allows the student to send a message to the master instructor. This message contains the student's name and network address so that the master instructor can respond to the question.

For maintenance purposes and to facilitate locating courses, relation 209 contains a list of all servers where the various courses reside. Thus, if a course becomes obsolete, a message may be sent from the main computer to all servers which have that particular course resident, so that the servers may make the course unavailable on the obsolescence date.

Resident on main computer 102, of FIG. 1, is a supervisory program 128 responsible for maintenance of repository 104. One task of supervisory program 128 is the automatic archiving of the database tables in repository 104. Tables 201 through 209 continuously grow as new courses are added, old courses become obsolete, students enroll, and students finish courses, etc. When the tables become very large performance of the system degenerates. Therefore, information about obsolete courses is removed periodically, e.g., once a week or once a month. When information is removed from the tables, it is moved into one or more archival files 215. Supervisory program 128 also contains code to recover information from archival files 215. A similar maintenance task is done on the various servers 106 by programs 130A–130C, respectively, i.e., moving information about obsolete courses from the database tables resident on the server into archival files, also resident on the server. These archival tasks are automatically triggered to occur at specific times or by specific events, e.g., a certain number of course versions have become obsolete or the number of students who have completed courses reaches a specified number.

Supervisory module 128 also provides on-line maintenance of the programs and databases supporting enrollments, charges for courses, and locations of course versions across the network.

The network 100 in FIG. 1 also contains provisions for uploading courses from workstations located anywhere in the network to the central repository 104. A course author may be located on any workstation and send a message to main computer 102 that a new version or a new course has been completed. The main computer 102 would then initiate moving the executable module and the control module for that course into disk drives 211 and 213 and update relations 201, 207, and 209, as appropriate and as approved by the curriculum advisory authority.

The courseware according to the present invention incorporates several features which improve student interest. For example, interaction with the courses and course management software is menu driven and icon based. The courses are implemented so that a student can request animation and simulation of the material covered in the course, as provided by the course author. Furthermore, the courseware incorporates interfaces to video material. In other words, a student taking a course on the assembly of a computer can request that certain steps be shown through video and that other steps be simulated using on-screen graphics and animation. In an alternative embodiment, these features are automatically executed when the student takes the course.

Returning to FIG. 4, the courseware according to the present invention includes a diagnostic expert system 421 which runs in the background of the course. The diagnostic expert system 421 is privy to all transactions between the student and the course. Using built in rules it directs the student through the course. If the student has particular difficulty with one subject area, the diagnostic expert system 421 increases the level of detail of the instruction in that subject area. On the other hand, if the student excels, the diagnostic expert system allows the student to progress through the course at a higher pace. The diagnostic expert system 421 analyzes the student's responses to questions to determine for which areas the student requires training. The diagnostic expert system 421 is a series of hook-points to particular addresses in the machine code implementation of the course. Using rules based on particular student responses, or on incorrect responses, the diagnostic expert system 421 directs the student to the appropriate training screens.

Also resident on servers 124 is an authoring system. The authoring system 124 provides an intelligent environment in which a course author creates courses. In the artificial intelligence domain of expert systems, a human expert is interviewed by a knowledge engineer, who builds an expert system. In the authoring system, templates for course screens are automatically derived from the expert interview.

Furthermore, the authoring system 124 incorporates an editing facility which allows for global search and replace of text strings, graphic images, etc. for entire course.

The authoring system 124 also provides a mechanism to allow authors to put string variable operations into courses. For example, in a VMS operating system course, a possible question is "Type an example of a directory command which lists all Pascal files created today." Several correct replies are possible, e.g., "$ DIR/SINCE *.PAS", "$ DIRECTORY *.PAS/SINCE", and "$ DIR/SINCE=TODAY [ ]*.PAS". Any of these replies should be considered a correct response. Similarly, the authoring system provides a mathematical function interface, wherein a student replies to questions using mathematical functions rather than by giving exact numbers. An example from electrical circuit theory is a problem to calculate the current through a particular resistor in a circuit. The answer to that question can be described in terms of Ohm's and Kirchhoff's laws rather than by giving the exact numerical value.

Figure 5:
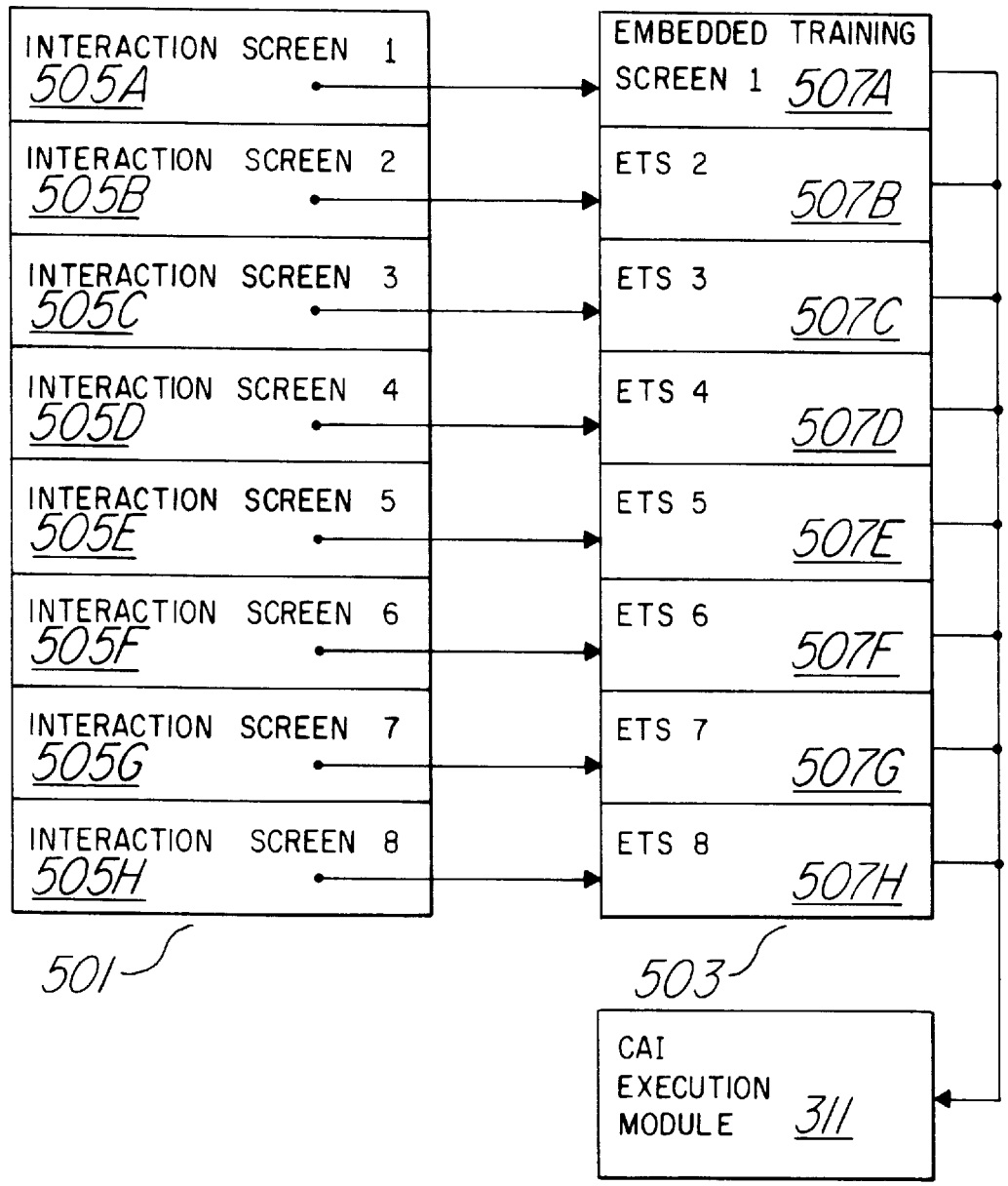
FIG. 5 shows the preferred embodiment embedded training program.

Related to the networked computer aided instruction system of the preferred embodiment is embedded training. In this aspect of the preferred embodiment the training is incorporated into the various computer programs executing on a workstation. This is illustrated in FIG. 5. Application program 501 is a screen oriented program. It is composed of eight interaction screens 505A–505H. Each interaction has a "hook point" to which is linked an embedded training screen 507A–507H. Through some action of the user of the application program, e.g., pressing a help button, the embedded training screen is invoked. The embedded training would be particularly pertinent to the screen from which it was invoked. Typically, the student is allowed 30 seconds to three minutes for completing the embedded training for a particular topic. However, if the student does not learn sufficient detail from the embedded training, then he or she may transfer directly from the embedded training to the computer aided instruction course 311 associated with the application program.

Figures 6, 8:
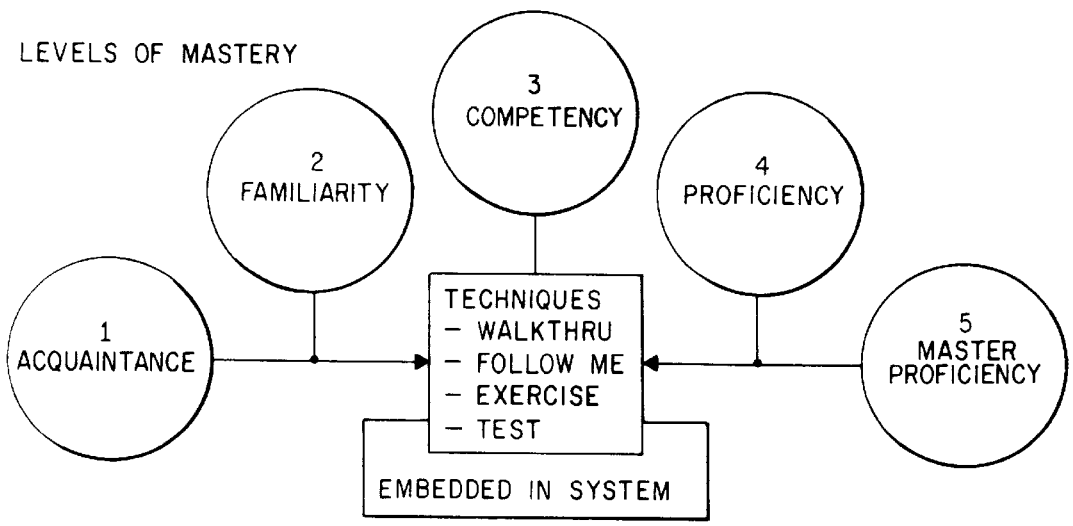
FIG. 6 shows features of the networked computer aided instruction and embedded training according to the preferred embodiment.
FIG. 8 shows the rule base for the diagnostic expert system of the present invention.

FIG. 6 shows two key features of the preferred embodiment. First, in the preferred embodiment courses are implemented for multiple levels of detail. In a university environment there is a distinct level of detail required by the University President who merely wants to know what the various offered courses teach, and the student who is trying to master a subject. Accordingly, in the preferred embodiment courses are developed for five different levels: Acquaintance, Familiarity, Competency, Proficiency, and Master Proficient. When a student invokes a course, the course queries the student as to what level he or she wishes to enroll.

The "Acquaintance" level is a high level overview of the subject matter of the course with no detail attached, e.g., looking at the objectives covering each lesson. The "Familiarity" level gives the student the ability to page through a course while reviewing detail information without having to respond to questions. The student also has the ability to branch to chapters or sections within a chapter. In the "Competency" level a student is presented material that will be test at the end of each lesson. The student must attain a specified passing score, e.g., seventy, in order to be certified as competent on the subject matter. The passing score indicates that the student is qualified to perform the tasks reviewed in the subject matter presented.

In the "Proficiency" level the student is first pretested to record the student's level of proficiency prior to taking the course. The student must pass any prerequisite course or topics required before enrolling into the course. Upon satisfying the prerequisite test the student is presented materials in which question and answer dialogues are continued throughout the course delivered to the student. The student must respond to multiple questions within the text delivered as well as pass a thorough test at the end of each lesson. Finally, the "Master Proficiency" level requires not only a prerequisite test as a requirement for enrollment but upon completion of the course, the student must be able to critique material given and append their knowledge to the topics covered by the course. After all tests are completed the student must maintain a high score, e.g., at least 90, for the entire course in order to be judged master proficient.

Furthermore, the courses are developed so as to give the student multiple options in terms of testing competency. First, the courses implement walk-throughs, in which students are guided through the procedure being taught by the course. A second technique is "Follow me" in which the course simulates the task that the student wishes to learn. Courses also implement exercises. These serve the dual purpose of giving the student some knowledge about his or her own progress and of giving the course administrators a means of monitoring student progress. In some courses the student may be required to complete a certain number of exercises in a given time unit, e.g., one set per week. If the student fails to meet this requirement, the course sends a message to the main computer to change the student's status to "falling behind." This status gives course administration notice to let the student's management know that the student is falling behind or having some kind of problem with the course.

Figure 7:
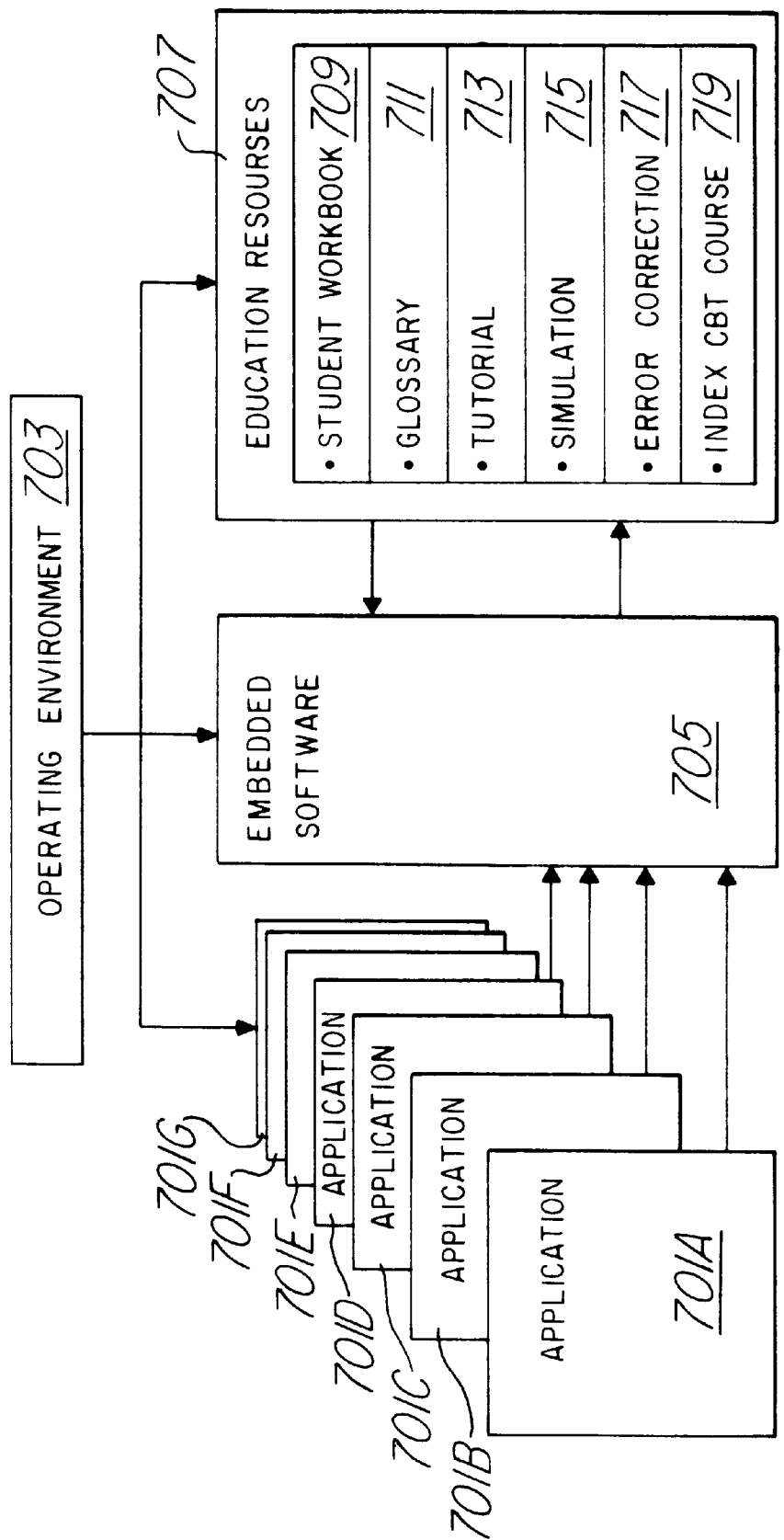
FIG. 7 shows how certain modules of the embedded training according to the preferred embodiment are shared between application programs.

FIG. 7 shows more detail of the embedded training system according to the preferred embodiment. The workstation is controlled by operating environment 703. This environment controls application programs 701A–701G, the embedded training software 705, and the education resources 707. As discussed above, each application program has one or more hook points into the embedded training software. More than one application can share the same embedded training. For example, in standardized user interfaces, many applications will do file access in the same manner, therefore it is appropriate that the training software associated with file access is common for all applications which share the file management software. The embedded software accesses the education resources 707. The education resources is a centralized repository for such things as the student workbook 709, the glossary 711, the tutorials 713, simulation software 715, error correction software 717, and the Index of Computer Based Training (CBT) courses 719.

In the embedded training aspect of the present invention, the diagnostic expert system 421 serves the role of monitoring the interaction of a system user with a system, and analyzing that interaction to determine when the user needs training in a particular subject matter. For example, if the embedded training is used in conjunction with an operating system and a user is trying to copy files, but fails to do so because of incorrect file specifications, the diagnostic expert system 421 executes a training screen on how to formulate a correct file specification.

FIG. 8 shows an example of a knowledge base of rules for the diagnostic expert system. Column 801 contains specific rules and column 803 the logical location where the course should resume if the rule is true. The entries in column 803 are in terms of the goals for the transition. For example, in row 809 if a student or user has problems with file specifications, the training screen for file specifications is displayed. Column 805 contains the memory locations for the machine code implementing the training screens in column 803.

Figure 9A:
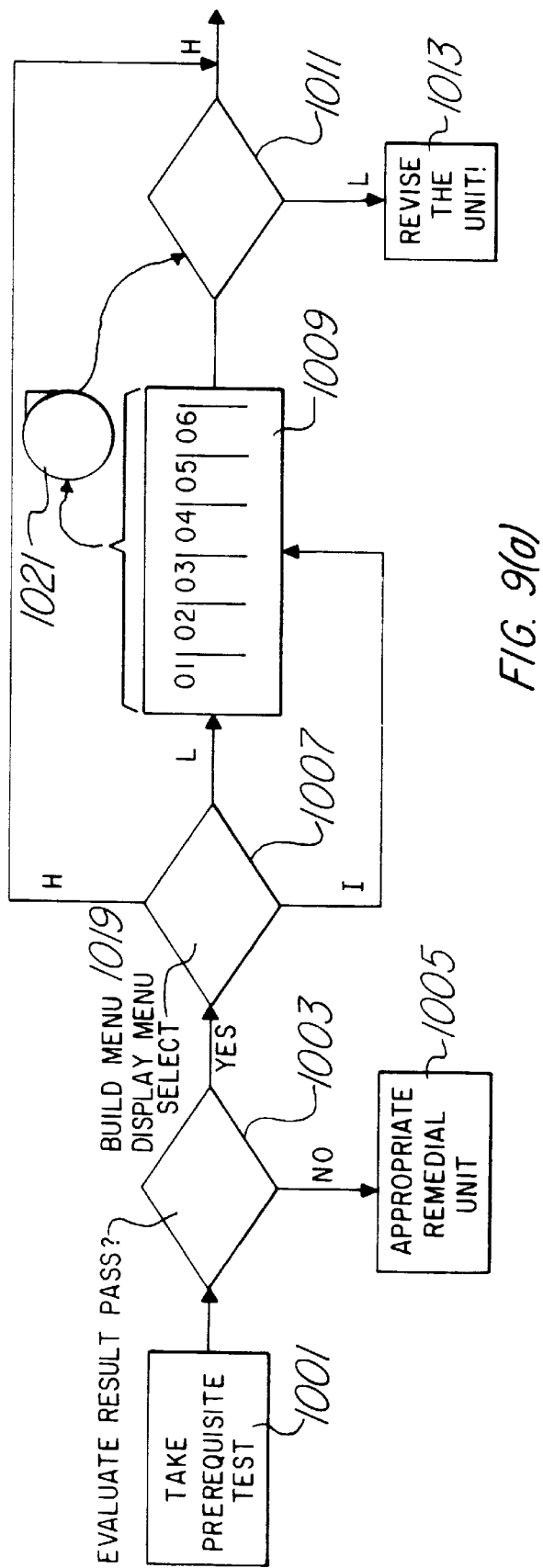
FIGS. 9(a) and 9(b) show the branching options available to a student taking a course implemented according to the preferred embodiment.
Figure 9B:
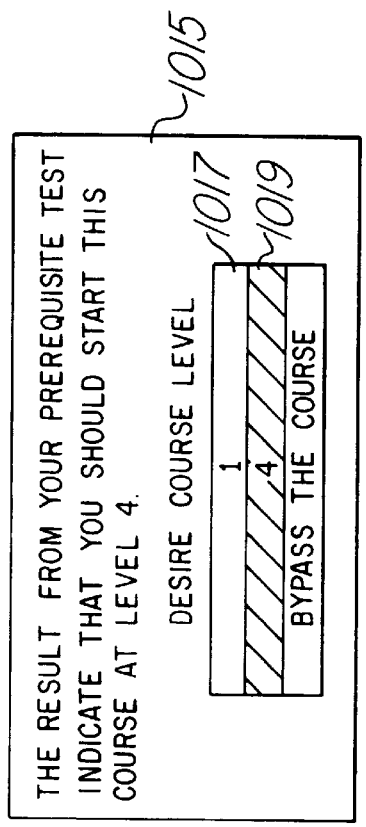

FIG. 9(*a*) shows the flow of control through the pre-enrollment phase of a course according to the present invention. The student may be required to take a prerequisite test, step 1001. This is a computerized or computer randomized test. The results from the test is analyzed in step 1003 to determine to which course level the student should enroll. If the student failed the test, he or she is directed to take a remedial course, step 1005. Step 1007 entails building a menu of the options available to the student in the event he or she attained a passing grade on the prerequisite test. The menu 1017, shown in screen 1015 of FIG. 9(*b*), is displayed to the user. The student has the options of taking all levels of the course, start at the level his or her score indicates to be the appropriate level given the student's competence level, and to bypass the course all together. These choices are shown in menu 1017 of FIG. 9(*b*).

After selection of a level, the course 1009 is invoked, during which the student reads materials, views video material, and answers questions. During the execution of course 1009 a summary file 1021 is built. The summary file 1021 is used in step 1011 to analyze the questions with respect to the answers given by the student. This analysis entails highlighting questions which are repeatedly answered incorrectly, so that the course or the question can be revised. The summary files and the analysis done on every server are sent via network 100 to the course author or course manager. The course author or manager further analyzes the summary files from multiple servers to decide whether the course should be revised, and revises the course, step 1013. In the event the author or manager revises the course, he or she sends the new course version to the main computer 102, where the courseware administrator decides whether or not to include the new version into the main repository. If the course is included, the version it replaces may be made obsolete, in which case a message to that effect is sent to all servers where the course resides and to all students currently enrolled in the course.

Figure 10B:
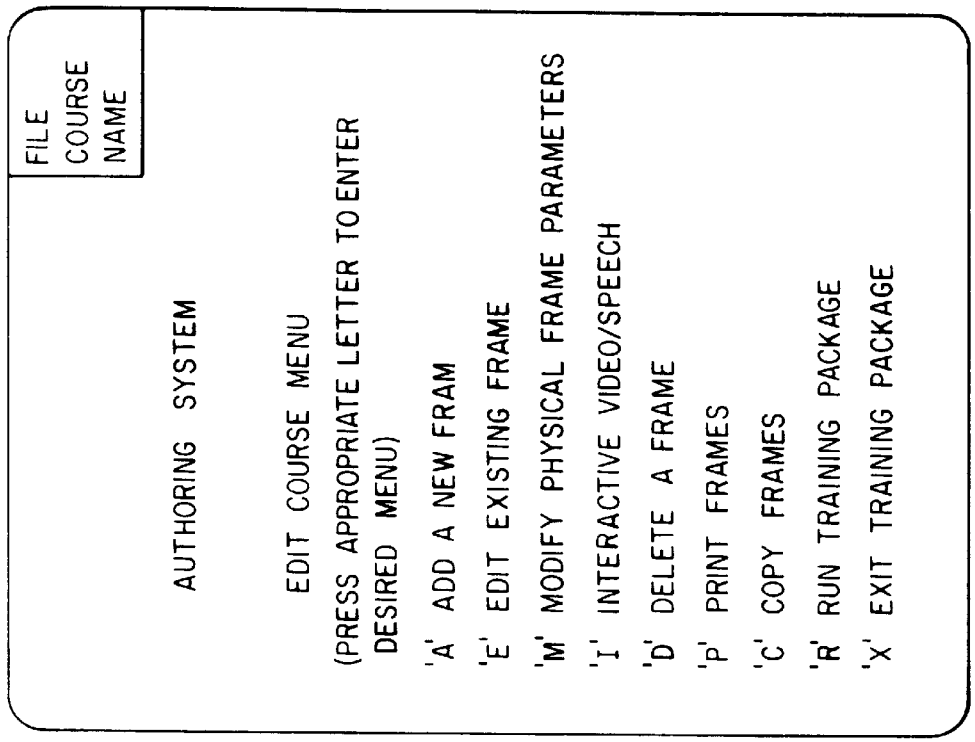
FIGS. 10(a), 10(b) and 10(c) show the main menus of the course authoring system of the present invention.
Figure 10A:
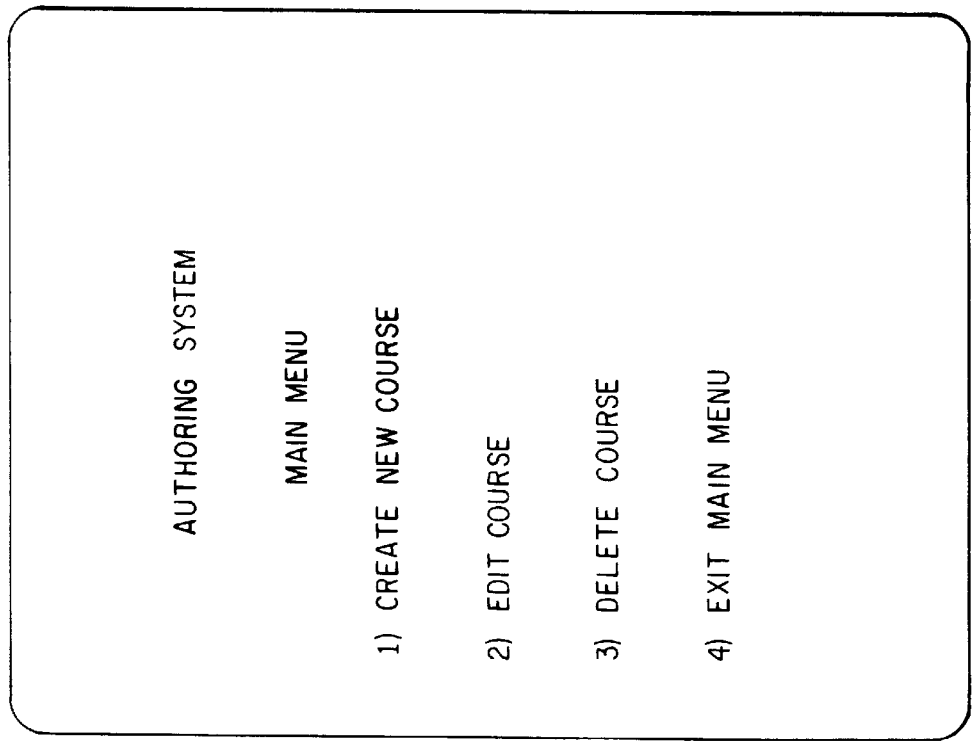
Figure 10C:
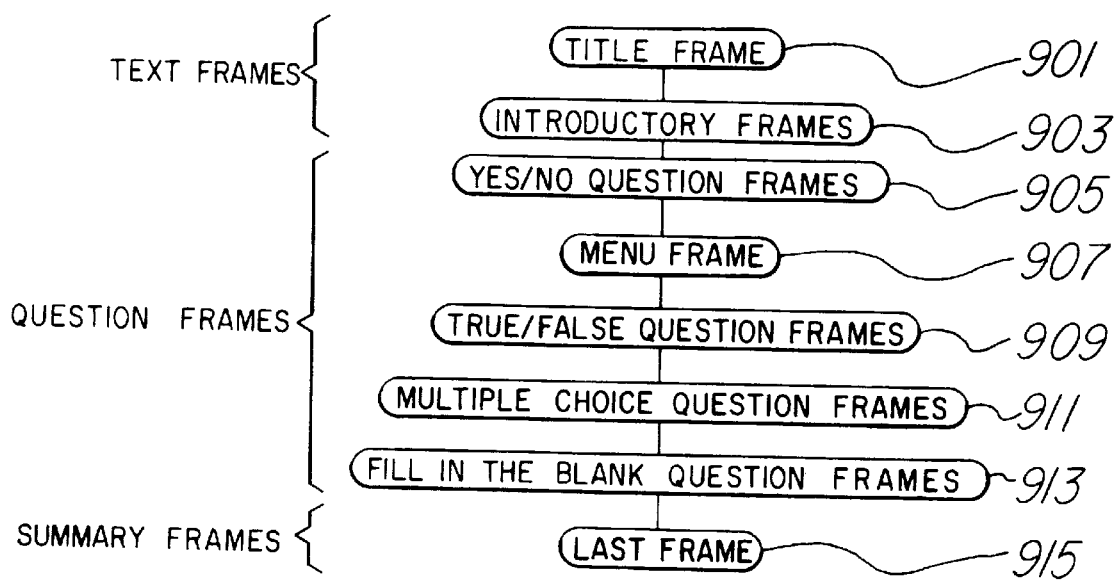
Figure 11A:
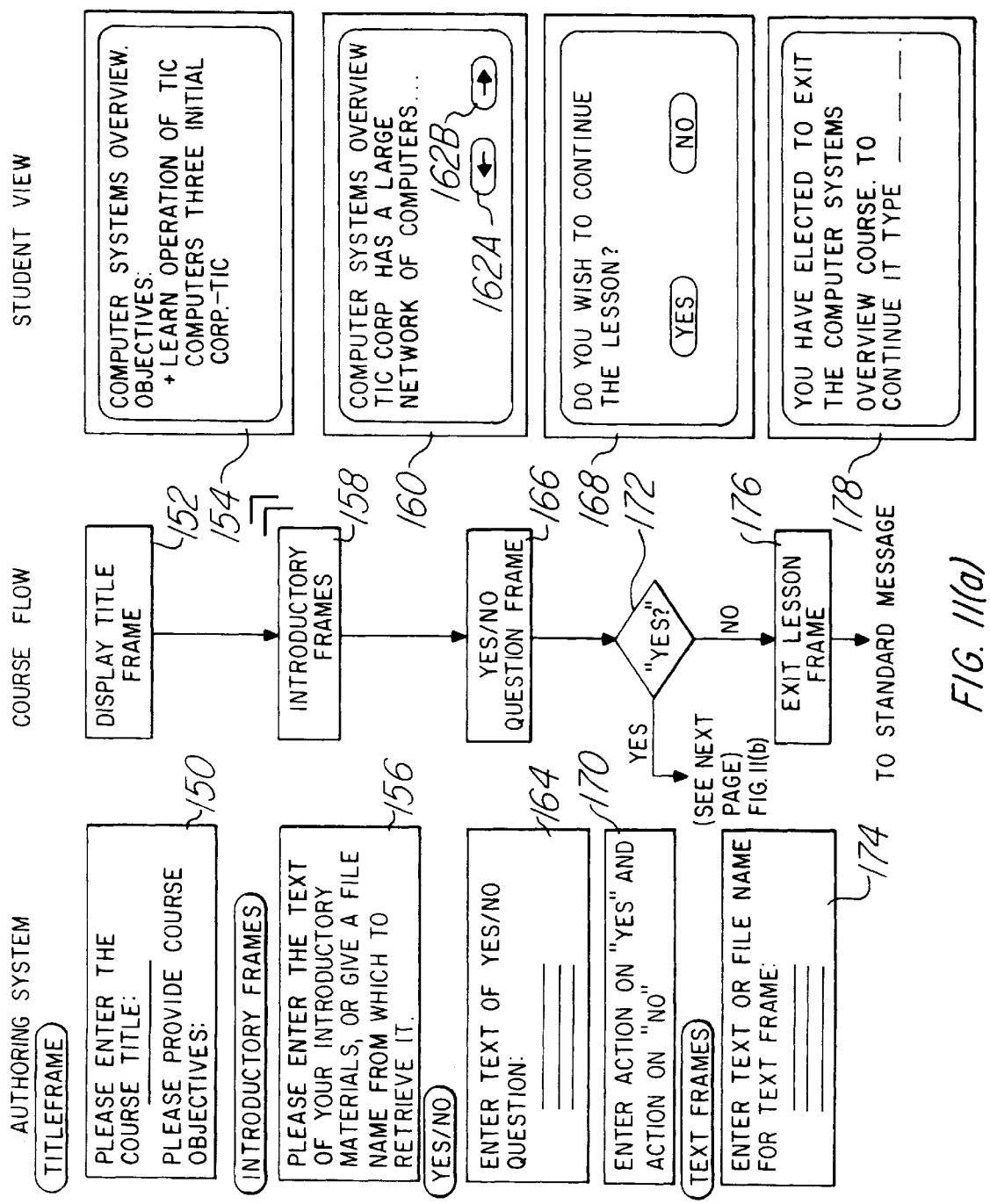
FIGS. 11(a), 11(b), 11(c), and 11(d) show the interaction between the author and the authoring system, the structure of a course created using the authoring system, and the student's view of the course, all according to the preferred embodiment of the invention.
Figure 11B:
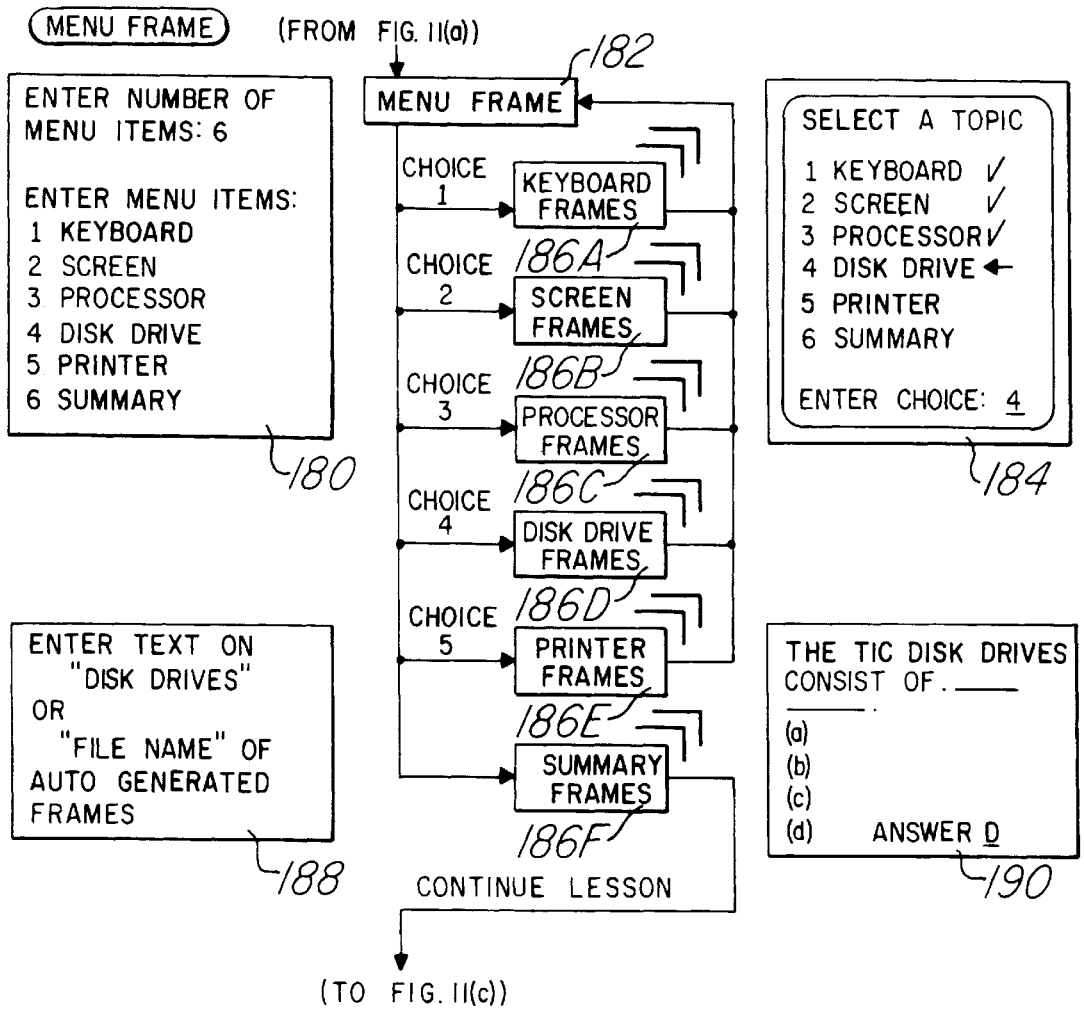
Figure 11C:
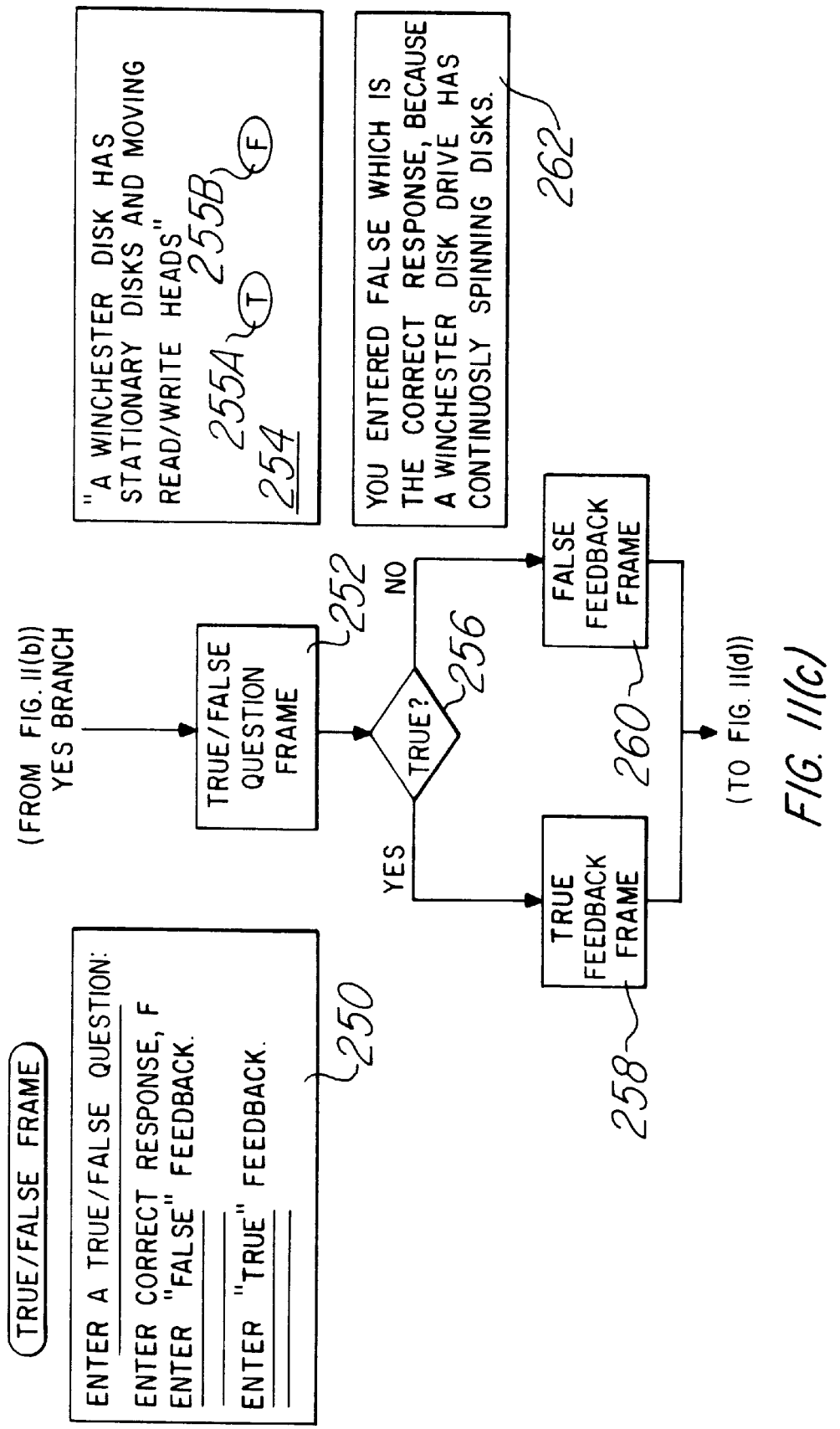
Figure 11D:
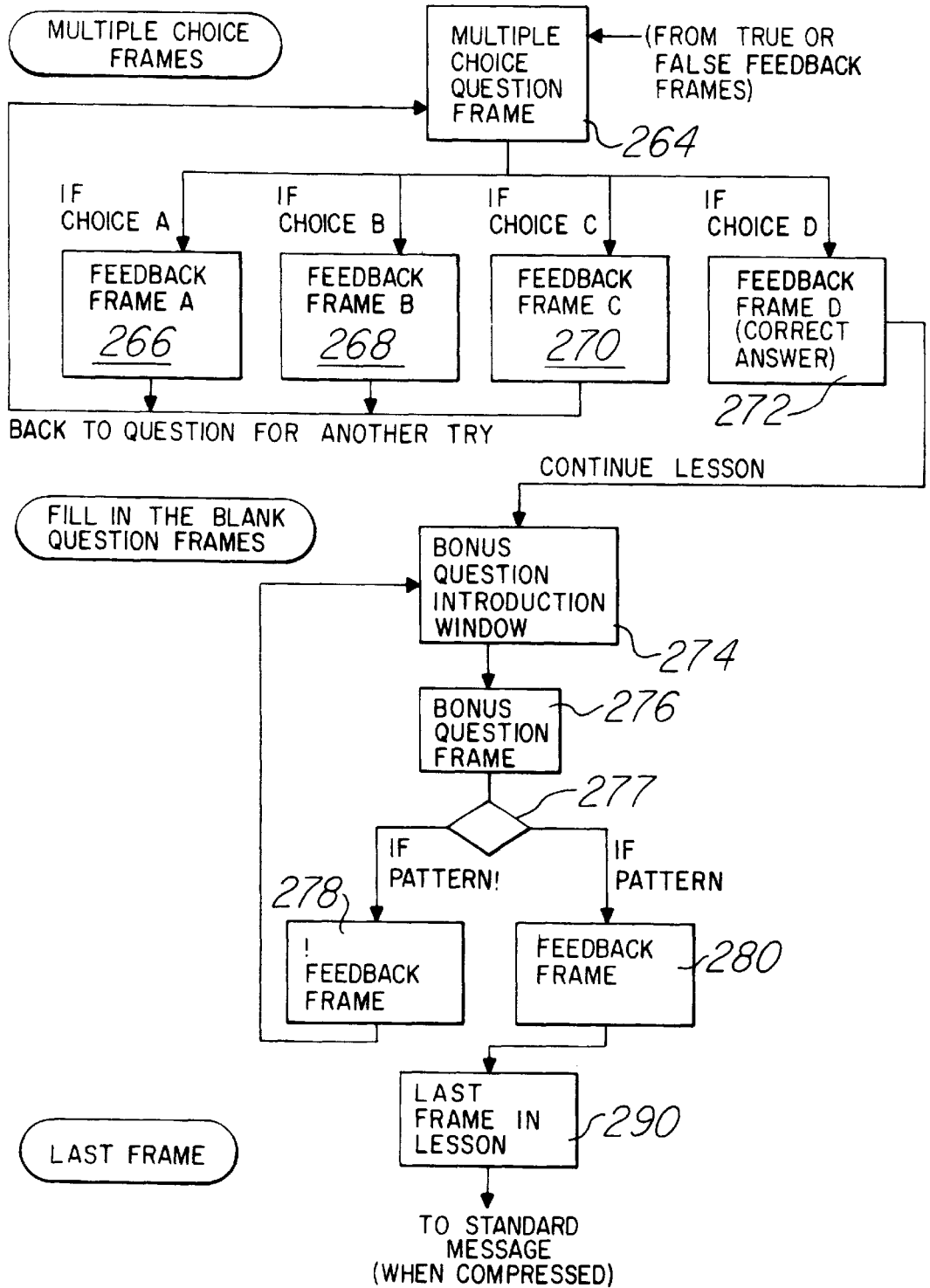

FIG. 10(*a*) shows the main menu of the course authoring system. The author interacts with the main menu by selecting the number of the desired option. As indicated the author may create a new course, edit a course, or delete a course. The main menu also provides an option for exiting. The selections which the author makes causes the authoring system to display one of several alternative screens.

FIG. 10(*b*) shows the screen which the authoring system displays whenever the author selects the "Edit course" option. For example, the author may use the EDIT COURSE MENU, shown in FIG. 10(*b*), to add a new frame, edit an existing frame, change frame parameters, select an interactive video/speech frame, delete a frame, print frames, copy frames, or run the training package. A frame is a unit of course-to-student interaction. Although not required, a frame often corresponds to one screen of information. However, because there is no limitation on frame size, two or more frames may be displayed on the screen at one time. This feature is useful to display a graphic in one frame, and querying the student about the graphic through another frame.

The "add a new frame," option transfers the user into the menu shown in FIG. 10(*c*), which is discussed in further detail below. The "edit a frame" option gives the author the ability to edit an existing frame. Frames can exist of text and graphics. Therefore, both the "add a new frame" and the "edit a frame" options enable the author to create and edit both text and graphics. For example, the authoring system, allows the user to create lines, circles, boxes, arcs, slices, and curves, in a frame. Similarly, in terms of text manipulation, the authoring system enables the user to select from different fonts. The frame editor also provides tools for image reproduction, and image manipulations, such as moving, deleteing, scaling and rotating images or portions of images. Further image manipulations include screen capture and the use of a full color palette for frame creation and editing.

The "modifying physical frame parameters" option refers to manipulation of frame size. Frames can make reference to interactive video and speech materials. The author uses the tools provided through the "interactive video/speech" option to establish the links of frames to these materials.

The main menu also allows the author to remove frames from courses, copy frames from one course to another, and to run the training package.

FIG. 10(*c*) shows some of the types of frames available to a course author. These are meant to be illustrative rather than limiting. The title frame 901 is used to display the course title and listing the course objectives. Other possible entries on the title frame are company logos and names of course authors, as well as last version of course.

The introductory frames 903 are used to communicate, to the student, the mechanics of the course, e.g., how to execute the package, how to answer various types of questions which appear in the course, who to contact if any difficulties arise, and how to exit the course should the student desire to leave. Title frame 901 and the introductory frames 903 are both text frames, i.e., they are non-interactive.

Frames 905 through 913 are interactive question frames. These are both used to allow the student to navigate through the course and to ask the student questions about the subject matter of the course. The latter category, subject matter questions, as discussed above, are created by an expert system. The course author is not necessarily the subject matter expert. The course author interviews the subject matter expert and creates an expert interview file. The expert system accepts as its input the expert interview file and automatically creates templates for course frames. The author edits these frames using the frame editing facilities of the authoring system.

The authoring system allows the author to define a last frame 915 specification. The last frame 915 is a summary frame and provides the student with information such as which is next course in a sequence of courses, who to contact to obtain a course completion certificate, and a sign-off message. The last frame is also used to verify that the person who completed the course is the same person who started taking the course.

FIG. 11 shows three views of a course. In the first column is the authoring system interactions used to create the course, in the second column is the structure of the course, and in the third column is the student's view of the course. By being able to view multiple windows, the course author has access to both the authoring system interaction view and the studentes view.

While FIG. 11 shows some example frames that may be used in a course, a course is not limited to this structure, and a person skilled in the art will realize many possible alternative course structures.

The authoring system displays screen 150 by selecting the "Title Frame" option in the menu shown in FIG. 10(*c*). The author enters the course title and course objectives in the indicated fields of screen 150. The authoring system takes this information and creates the structure 152 for the corresponding title frame. When the student executes the course, the title frame is displayed as shown in screen 154.

The author creates the introductory frames by first selecting the "Introductory Frames" option on the menu shown in FIG. 10(*c*). The introductory frames may either be entered interactively or incorporated from computer files, as shown in screen 156. The introductory frames may also be derived from the expert interview. When the author has completed creating the introductory frames they are incorporated into the course structure in blocks 158. The student views the introductory frames as shown in screen 160. The introductory frames provide means of navigation forward and backwards through the frames, as indicated by buttons 162A and 162B. The forward and backward navigation can also be accomplished by using cursor keys or specially designated function keys.

Certain types of frames create multiple paths through the course. This is illustrated by YES/NO question frames 164 through 172. The author is prompted by the authoring system for text of a question, e.g., "Do you wish to continue the lesson?". This creates the required structure in the course, such as the frame 166 and the logic block 172. The course displays the screen 168 to the student. Logic block 172 provides two paths: one for the "yes" answer and one for the "no" answer.

In the course shown in FIG. 11 the "no" response results in the display of a text frame 178. The author is prompted for the text or a filename of a file where the text can be found, as shown in block 174.

Another multiple path frame is the menu frame 182 shown in FIG. 11(*b*). It is created using screen 180 of the authoring system. In screen 180 the author is prompted for the number of choices in the menu and the titles of the various choices. The authoring system uses this information to create the structure shown below block 182. The menu created by the authoring system is displayed to the user as shown in screen 184. Screen 184 also displays to the user the topics that he or she has completed as indicated by the √ symbol displayed next to the course title. The author is also prompted for frame identifiers for the frames that represent the paths corresponding to the various choices (This is not shown). Each path corresponding to a menu choice consists of a sequence of frames 186A–186F, respectively. The paths exiting a sequence of frames 186 may take one of several routes, e.g., back to menu frame 182 for further selections, as shown from frames 186A–186E, or to other parts of the course, as shown exiting from frame 186F.

Screen 188 shows an example of the interaction between the authoring system and the course author for the creation of a text frame which make up one of the sequences selected through menu frame 182, in this case a multiple choice frame. The frame may have originated as a template created by the expert system from the expert interview and subsequently edited by the author. An example of the flow of control from a multiple choice frame is shown in FIG. 11(*d*) as blocks 264 through 272, and is discussed in further detail below.

Another possible interaction frame is the "true/false" question frame, shown in FIG. 11(*c*) as blocks 250–262. The authoring system requires the author to create a question, indicate whether "False" or "True" is the correct response, and provide feedback information for both alternatives. From this information the authoring system creates the structure shown as frame 252, logic block 256 and feedback frames 258 and 260. The student views the question as shown in screen 254, which also includes response buttons 255A and 255B. When the student buttons a response, e.g., the F button 255B, control in the course goes through the path corresponding to that button, which in the shown example is through feedback frame 260. Feedback frame 260 is displayed as shown in screen 262.

FIG. 11(*d*) shows the course structure corresponding to some additional interaction screens. (Not shown is the authoring system interaction and the student interaction. These are similar in nature to those of the frames discussed above.) Multiple choice question frame 264 can have two or more possible answers. Usually one answer represents a correct response. A text frame 266–272 is associated with each response to give the student feedback regarding the entered response. For incorrect responses the course may return to the question frame 264, as shown, or, alternatively, not give the student the opportunity to attempt to answer the question again.

Blocks 274–280 represent a question asked through a fill-in-the-blank frame. Text frame 274 introduces the question and gives the student any additional information needed to answer the question. Question frame 276 presents the question to the student with blanks to fill in. Block 277 is a pattern matcher, which functions to determine whether the answer provided by the student matches the pattern given by the author. As with the multiple choice question and the true/false question, discussed above, the course provides feedback to the student depending on the student's response to the question, as shown by blocks 278 and 280.

The example course shown in FIG. 11, concludes with frame 290 which provides the course wrap-up information discussed above in conjunction with FIG. 10(*c*).

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

We claim:

1. A network system for computer aided instruction, comprising:

a main computer including a repository for storing courseware;

a network of servers connected to said main computer, each of said servers having a control module;

a plurality of local area networks, each of said local area networks connected to a server, and each of said local area networks comprising a plurality of interconnected workstations;

a distributed delivery system responsive to a request of said server for a course of said courseware, selectively operable to search said network of said servers for said server where said course resides, operable to transfer said course from said server where said course resides, and selectively operable to retrieve said course from said repository if said course cannot be found at said server;

an authoring system distributed over a workstation of said workstations, said servers and said main computer, and operable to transfer courses of said courseware from said workstation to said repository; and a course management system distributed over said workstation, said servers and said main computer, and operable to manage course enrollment and to monitor student performance at said servers, and further operable to transfer information corresponding to said course enrollment from said servers to said main computer;

wherein said network of servers comprises a first set including said servers connected to said main computer, a second set including said servers connected to other servers and to said main computer, and a third set including said servers connected to said other servers; and wherein said course is prevented from being copied by said control module.

2. The network system of claim 1, wherein said repository comprises:

a database for storing additional information corresponding to said courses and students enrolled in said courses; and file storage for the storage of programs implementing said courses.

3. The network system of claim 1, wherein said distributed delivery system comprises programs distributed over said servers in said workstation; and wherein said programs communicate by sending messages.

4. The network system of claim 1, wherein said main computer further includes a supervisory module.

5. The network system of claim 4, wherein said supervisory module is operable to automatically archive information, to manage student enrollment, and course accounting.

6. The network system of claim 5, wherein said supervisory module is operable to request said other servers in said network to provide said supervisory module with information required by said supervisory module to maintain said repository.

7. The network system of claim 6, wherein said supervisory module communicates with said other servers by sending messages across said network.

8. The network system of claim 7, wherein said messages are standardized so that said servers of different manufactures can communicate with said other servers.

9. A computer aided instruction system, comprising:

a network of interconnected servers;

a main computer connected to at least one of said servers;

a repository connected to said main computer;

at least one workstation connected to one of said servers; and an authoring system distributed over said at least one workstation, said servers, and said main computer to deliver a course from said at least one workstation to said repository; and a diagnostic expert system to increase or decrease the level of detail of said course.

10. The computer aided instruction system of claim 9, wherein said authoring system comprises programs resident on said at least one workstation, said servers, and said main computer.

11. The computer aided instruction system of claim 10, wherein said programs communicate by sending messages.

* * * * *